March 10, 1925.

W. O. BACKUS

BAKING PROCESS

Filed June 19, 1923

1,529,107

INVENTOR
WILLIAM O. BACKUS
BY
ATTY.

Patented Mar. 10, 1925.

1,529,107

UNITED STATES PATENT OFFICE.

WILLIAM O. BACKUS, OF SAN FRANCISCO, CALIFORNIA, ASSIGNOR TO ZED CORPORATION, OF SAN FRANCISCO, CALIFORNIA.

BAKING PROCESS.

Application filed June 19, 1923. Serial No. 646,491.

*To all whom it may concern:*

Be it known that I, WILLIAM ORRIN BACKUS, a citizen of the United States, residing in the city and county of San Francisco, and State of California, have invented a new and useful Improvement in Baking Processes, of which the following is a specification.

My invention relates to improvements in a baking process, and particularly in a process of baking health biscuits and the like wherein the principal body ingredients are bran and entire wheat flour.

The primary object of my invention is to provide an improved process for baking biscuits of the character described.

Another object is to obtain a complete dehydration of the baked dough.

A further object is to obtain a thorough and uniform baking whereby the center may be thoroughly cooked without causing the edges to be overcooked or burned.

A still further object is to provide an improved process of baking whereby the biscuit may be moved substantially continuously through successive baking and cooling steps adapted to obtain thorough cooking and dehydrating of bran and entire wheat dough.

I accomplish these and other objects by means of the process hereinafter described and which is illustrated in the drawings forming a part of the present specification wherein like characters of reference are used throughout said specification and drawings and in which, Fig. 1 is a diagrammatic illustration of my improved process.

Figure 1:
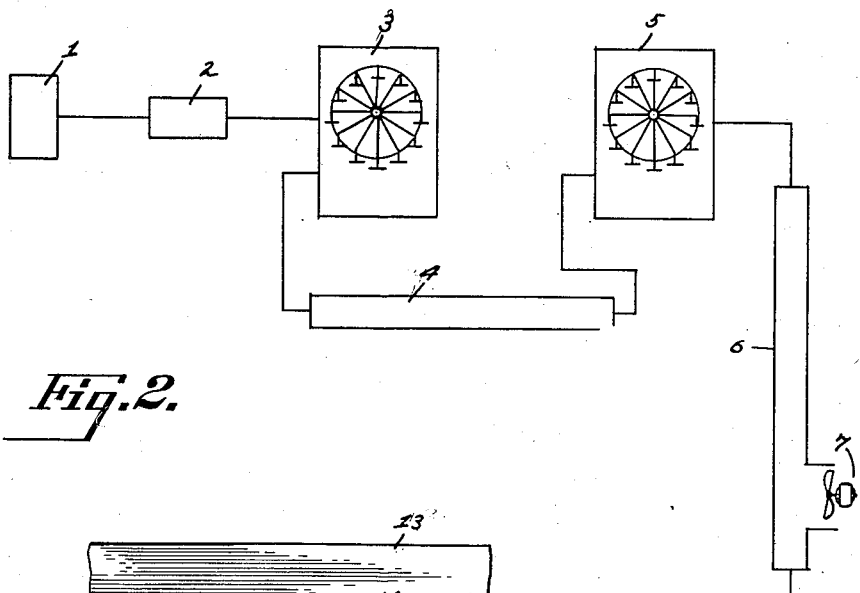

The present invention relates particularly to the baking of biscuits and the like of the character commonly known as "health biscuits" or "health cookies" wherein the body of the biscuit consists essentially of bran and entire wheat mixed approximately in the proportion of four parts of bran to one part of entire wheat, to which sufficient fluid is added to make a workable dough, and to which suitable amounts of leavening, sweetening and other elements have been added. In this connection it is essential to note that the essential body ingredients, namely bran, results in the production of dough presenting an unusually difficult problem in baking. This difficulty is due largely to the fact that dough prepared from the above mentioned ingredient necessitates a quick baking at a relatively high temperature in order to obtain a proper action of the leavening elements while at the same time, in order to obtain a complete dehydration such as is essential to the particular character of biscuit described, a prolonged baking at a relatively low temperature is desirable. It is obviously impossible to accomplish both of these results in the ordinary baking process and as a result the makers of this character of biscuit have been heretofore compelled to accept a compromise condition sacrificing a part of the merit obtainable by either extreme in favor of a portion of the advantage to be obtained from the opposite extreme. My present invention is therefore directed to a process whereby the advantages of both extreme conditions may be obtained without sacrificing any of the advantages of either, and which in fact, will obtain a more effective dehydration and hence a more desirable product than heretofore possible.

My improved process consists in first baking the prepared dough for a limited period in an oven of relatively high temperature, the dough having been first mixed and prepared for baking in accordance with the accustomed usages of the trade except that in forming the biscuit the dough is shaped in a manner hereinafter more fully described whereby the biscuit may be best suited to the succeeding baking operations. The initial baking is preferably carried out in an oven at approximately 550° F. and during a period of approximately 7 minutes, which time and temperature is adapted to cause the leavening elements to obtain the desired amount of leavening of the biscuit.

After the initial baking period the biscuits are removed from the oven and subjected to a predetermined period of cooling at ordinary room temperature, said period being preferably about five minutes. During this period of cooling a large portion of the moisture contained within the biscuits is given off in the form of steam, and vapor from the now partially cooked biscuit.

After the cooling period the biscuits are placed in an oven for a second baking period, the second oven being preferably maintained at approximately 330° F. and the biscuits allowed to remain in this oven for approximately 7 minutes. During this second baking period the cooking is retarded so as to allow the product to be thoroughly and uniformly baked, and at the same time to permit the remaining moisture within the biscuit to be given off.

When the biscuits are removed from the second oven they are again cooled, a draft of dry air being directed upon them to assist in driving off any moisture which may remain in the biscuit due to humidity within the oven.

Figure 2:
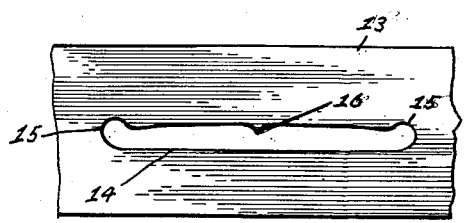
Fig. 2 is a broken front elevation of a shaping die by which the dough may be shaped prior to baking.
Figure 3:
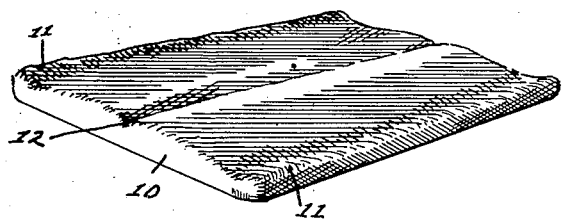
Fig. 3 is a perspective view of the biscuit produced by my improved process.

In my present practice my improved process is carried out in the following manner which is illustrated diagrammatically in Fig. 1 of the drawing wherein 1 represents the mixing chamber wherein the dough is initially mixed. The mixed dough is passed through a biscuit forming machine 2 which may be of any of the various types in common usage wherein the dough is automatically fed through moulding elements and cutting elements whereby the dough is shaped and cut to form biscuits 10 of desired shape. In this operation I provide for forming thickened edges 11 upon the edge of the biscuits and also for the forming of a centrally disposed longitudinal indentation 12, as shown in Fig. 3. This is accomplished by providing the forming machine 2 with a die 13 of special construction, as shown in Fig. 2 having enlarged ends 15 and a central inwardly disposed extension 16, the dough being forced through this die to form a continuous ribbon conforming in cross section to the shape of the opening 14, the ribbon thereafter being severed to form individual biscuits in the ordinary manner. This particular shaping of the biscuit is important for the reason that the particular ingredients which form the body of the biscuit, namely bran and entire wheat, are particularly subject to burning along the edges before the center of the biscuit can be thoroughly cooked. By providing the thickened edges 11 the cooking of these portions is retarded and by indenting the center of the biscuit the cooking of this portion accelerated to such an extent that a uniform cooking can be secured throughout.

The shaped biscuits are placed upon suitable trays and introduced into an oven 3 for the initial baking period. The oven 3 is preferably of the type wherein the trays are received upon shelves carried upon a rotating reel which is actuated at a rate that each tray will be carried to the point of removal in a predetermined time after being introduced into the oven, this period in the present case being made approximately 7 minutes.

When the trays of partially baked biscuits are removed from the oven 3 they are placed successively upon a conveying means 4 whereby they are conveyed to a second oven 5. The distance moved and rate of movement of the conveyor is adjusted to consume a predetermined period of time whereby the biscuits may be allowed to cool for a definite length of time between baking operations, a period of five minutes being best suited to the present process.

The oven 5 is similar in construction and operation to the oven 3 except that the oven 5 is maintained at a lower temperature, namely 330° F. In this oven the biscuits are baked for an additional period of 7 minutes as above described.

After the second baking period the trays are removed from the oven 5 and placed upon a conveyor 6 for cooling. The second conveyor is preferably housed in any appropriate manner and a draft of dry air directed over the biscuits to cool and effectually remove further traces of moisture from the biscuits. The draft of air may be created in any suitable manner as by a fan 7 mounted in connection with the conveyor housing. This operation extends through a period of approximately ten minutes.

When the biscuits are removed from the conveyor 6 they will be cooled and thoroughly dehydrated so that they may be immediately packed in cartons or the like, for marketing, thus permitting successive operations from mixing to packing, to be carried out substantially without interruption.

The precise character of the ovens and conveyors above described is of course not material to the present invention as the process described may be carried out with ovens and conveyors of any available character, and the specific temperatures and the periods of time consumed in the various steps may be modified in various ways to meet different requirements without departing from the spirit of my invention.

Having thus described my invention what I claim as new and desire to secure by Letters Patent is:

1. The process of baking biscuits and the like which consists in baking prepared biscuit dough for an initial baking period at relatively high temperature for a limited period of time; cooling said biscuits for a predetermined period; and thereafter baking said biscuits for a second period for a limited time at lower temperature.

2. The process of baking biscuits and the like which consists in baking prepared biscuit dough for an initial baking period at relatively high temperature; cooling the biscuits for a predetermined period; baking the biscuits for a second period at a lower temperature; and thereafter subjecting the biscuits to a draft of air for dehydrating and cooling the biscuits.

3. The process of baking biscuits which consists in baking prepared biscuit dough for an initial baking period of 7 minutes at 550° F.; cooling and dehydrating said biscuits for a period of 5 minutes; baking the biscuits for a second period of 7 minutes at 330° F., and thereafter subjecting the biscuits to a cooling and dehydrating draft for 10 minutes.

4. The process of baking biscuits which consists of initially shaping prepared biscuit dough with a central longitudinal indentation; baking said shaped dough for an initial baking period at relatively high temperature; cooling the partially baked biscuits for a predetermined period; and then baking said biscuits for a second period at a lower temperature.

5. The process of baking biscuits which consists of initially shaping prepared biscuit dough into biscuits provided with thickened edges and a central longitudinal identation; baking said biscuits for an initial period at a relatively high temperature; cooling the partially baked biscuits for a predetermined period; and then baking said biscuits for a second period at a lower temperature.

6. The process of baking biscuits which consists of initially shaping prepared biscuit dough into biscuits provided with thickened edges and a central longitudinal identation; baking said biscuits for an initial period at a relatively high temperature; cooling the partially baked biscuits for a predetermined period; and then baking said biscuits for a second period at a lower temperature; and thereafter subjecting the biscuits to a cooling and dehydrating draft.

7. The process of baking biscuits which consists of initially shaping biscuit dough, the body ingredients of which are bran and entire wheat, into biscuits provided with thickened edges and a central longitudinal indentation; baking said biscuits for an initial limited period at a relatively high temperature; cooling the partially baked biscuits for a predetermined period; and then baking the biscuits for a second limited period at a lower temperature.

In witness whereof I hereunto set my signature.

WILLIAM O. BACKUS.